US011990594B2

(12) United States Patent
Cournoyer et al.

(10) Patent No.: US 11,990,594 B2
(45) Date of Patent: May 21, 2024

(54) CELL MODULE BARRIER SHEETS FOR THERMAL PROPAGATION RESISTANCE

(71) Applicant: Rivian IP Holdings, LLC, Plymouth, MI (US)

(72) Inventors: Travis Cournoyer, Redondo Beach, CA (US); Kyle Butterfield, Rancho Santa Margarita, CA (US); Tyler Jacobs, Redondo Beach, CA (US); Nicholas West, Carlsbad, CA (US); Daniel Beverley, Westminster, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 152 days.

(21) Appl. No.: 17/353,489

(22) Filed: Jun. 21, 2021

(65) Prior Publication Data
US 2022/0407142 A1    Dec. 22, 2022

(51) Int. Cl.
*H01M 10/6554* (2014.01)
*H01M 10/643* (2014.01)
*H01M 50/107* (2021.01)
*H01M 50/209* (2021.01)
*H01M 50/213* (2021.01)

(52) U.S. Cl.
CPC ..... *H01M 10/6554* (2015.04); *H01M 10/643* (2015.04); *H01M 50/107* (2021.01); *H01M 50/209* (2021.01); *H01M 50/213* (2021.01)

(58) Field of Classification Search
CPC .......... H01M 10/0422; H01M 50/213; H01M 10/6554; H01M 10/643; H01M 50/107; H01M 50/209
See application file for complete search history.

(56) References Cited

U.S. PATENT DOCUMENTS

| 597,525 | A | * | 1/1898 | Mclane et al. | |
| 653,812 | A | * | 1/1900 | La Fleur | |
| 7,655,195 | B1 | * | 2/2010 | Ichikawa | B01D 46/2482 428/116 |
| 10,923,694 | B1 | * | 2/2021 | Pack | H01M 50/284 |

(Continued)

FOREIGN PATENT DOCUMENTS

| CN | 107170935 A | * | 9/2017 | .......... H01M 2/1077 |
| JP | 2007149560 A | * | 6/2007 | |

(Continued)

*Primary Examiner* — Milton I Cano
*Assistant Examiner* — Mary G Henshaw
(74) *Attorney, Agent, or Firm* — HALEY GUILIANO LLP

(57) ABSTRACT

A barrier structure, a battery module including the barrier structure, and a method of assembling the battery module are provided. The barrier structure includes a plurality of first sidewalls oriented in a first direction, and a plurality of second sidewalls oriented in a second direction. The plurality of first sidewalls interlock with the plurality of second sidewalls to form a grid structure comprising a plurality of cells, each having an open-ended top and an open-ended bottom and configured to be arranged around a cylindrical section of at least one of a plurality of battery cells. The battery module includes a plurality of cylindrical battery cells arranged in a predetermined pattern and a barrier structure for separating the battery cells.

17 Claims, 9 Drawing Sheets

(56) References Cited

U.S. PATENT DOCUMENTS

| | | | |
|---|---|---|---|
| 2013/0071705 A1* | 3/2013 | Frutschy | H01M 50/224 |
| | | | 429/62 |
| 2014/0287297 A1* | 9/2014 | Reitzle | H01M 50/24 |
| | | | 429/163 |
| 2018/0309107 A1* | 10/2018 | Widener | H01M 10/658 |
| 2020/0035967 A1* | 1/2020 | Yoon | H01M 10/658 |
| 2020/0220132 A1* | 7/2020 | Bourke | H01M 10/6556 |
| 2021/0126302 A1* | 4/2021 | Hooper | H01M 10/643 |
| 2022/0077443 A1* | 3/2022 | Donovan | H01M 50/20 |
| 2022/0263181 A1* | 8/2022 | Kovent | H01M 50/258 |

FOREIGN PATENT DOCUMENTS

| | | | |
|---|---|---|---|
| JP | 2009-021223 A | | 1/2009 |
| JP | 2018073794 A | * | 5/2018 |
| JP | 2020-513141 A | | 4/2020 |
| KR | 10-2017-0022460 A | | 3/2017 |
| KR | 10-2019-0040403 A | | 4/2019 |
| KR | 10-2019-0078094 A | | 7/2019 |
| WO | 2018/037860 A1 | | 3/2018 |

* cited by examiner

CELL MODULE BARRIER SHEETS FOR THERMAL PROPAGATION RESISTANCE

INTRODUCTION

The present disclosure is directed to barrier sheets for a battery module, and more particularly to barrier sheets for preventing propagation of a thermal event from one cell to other adjacent cells in a battery module.

SUMMARY

It is advantageous to package battery cells closely in high-voltage, large-format battery modules to provide high energy density battery modules. However, as the number of battery cells in a single battery module increases, the likelihood that a cell casing of one of the battery cells in the battery module failing (e.g., due to internal battery cell defects) also increases. Accordingly, in some embodiments, it may be advantageous to provide a heat- or fire-resistant barrier between cells to reduce or prevent propagation of a thermal event from one cell to other adjacent cells. It may also be advantageous to provide such barriers without significantly increasing the size or weight of the battery module (e.g., such as the weight increase caused by potting the battery cells with a flame retardant potting material). Additionally, battery modules may have different numbers of battery cells or different battery cell form factors for different applications. Accordingly, in some embodiments, it may be advantageous to provide a heat- or fire-resistant barrier that can be easily adapted for different numbers of cells or different battery cell form factors.

To solve one or more of these problems, a barrier structure, a battery module including the barrier structure, and a method of assembling the battery module are provided. The barrier structure includes a plurality of first sidewalls potentially oriented in a first direction, and a plurality of second sidewalls potentially oriented in a second direction. The plurality of first sidewalls interlock with the plurality of second sidewalls to form a grid structure comprising a plurality of cells, each having an open-ended top and an open-ended bottom and configured to be arranged around a cylindrical section of at least one of a plurality of battery cells.

The battery module includes a plurality of cylindrical battery cells arranged in a predetermined pattern, and a barrier structure. The barrier structure includes a plurality of first sidewalls oriented in a first direction, and a plurality of second sidewalls oriented in a second direction. The plurality of first sidewalls interlock with the plurality of second sidewalls to form a grid, patterned, and/or interlocking structure comprising a plurality of cells, each having an open-ended top and an open-ended bottom and configured to be arranged around a cylindrical section of at least one of a plurality of battery cells.

The method of assembling a battery module includes providing a plurality of battery cells, a plurality of first sidewalls, and a plurality of second sidewalls. The method further includes arranging the plurality of battery cells in a predetermined pattern, orienting the plurality of first sidewalls in a first direction, orienting the plurality of second sidewalls in a second direction, and interlocking the plurality of first sidewalls with the plurality of second sidewalls to form a grid structure comprising a plurality of cells, each of the plurality of cells having an open-ended top and an open-ended bottom. The method further includes arranging each of the plurality of cells around a cylindrical section of at least one of the plurality of battery cells.

In some embodiments, each one of a subset of the plurality of cells may be formed by a first pair of sidewalls, of the plurality of first sidewalls, arranged next to each other in the battery module, and a second pair of sidewalls, of the plurality of second sidewalls, arranged next to each other in the battery module.

In some embodiments, the first direction may be substantially perpendicular to the second direction.

In some embodiments, each of the plurality of first sidewalls may include a plurality of first slits spaced apart in the first direction, each of the plurality of first slits extending from the open-ended bottom toward the open-ended top. Each of the plurality of second sidewalls may include a plurality of second slits spaced apart in the second direction, each of the plurality of second slits extending from the open-ended top toward the open-ended bottom. Each of the plurality of first slits may be configured to interlock with a corresponding one of the plurality of second slits to form the grid structure.

In some embodiments, the plurality of cells of the grid structure may be shaped to accommodate the plurality of battery cells arranged in a close-hex-pack configuration.

In some embodiments, each of the plurality of first sidewalls and the plurality of second sidewalls may include a serpentine shape along a longitudinal direction of each sidewall.

In some embodiments, the plurality of first sidewalls may be arranged such that the serpentine shapes of the plurality of first sidewalls are in phase with each other with respect to the first direction.

In some embodiments, the plurality of second sidewalls may be arranged such the serpentine shapes of adjacent ones of the plurality of second sidewalls are 180 degrees out of phase with each other with respect to the second direction.

In some embodiments, the serpentine shape of each of the plurality of first sidewalls may include a plurality of adjacent first arcs, and a length of each of the first arcs may be 110 to 130 degrees of a circle.

In some embodiments, the serpentine shape of each of the plurality of second sidewalls may include a plurality of adjacent second arcs, and a length of each of the second arcs may be 50 to 70 degrees of a circle.

In some embodiments, the plurality of first sidewalls and the plurality of second sidewalls may include a plastic material.

In some embodiments, the plurality of first sidewalls and the plurality of second sidewalls may include a meta-aramid fiber material or a ceramic fiber paper material.

In some embodiments, the plurality of first sidewalls and the plurality of second sidewalls may include a rubber material or a silicone material.

In some embodiments, each of the plurality of cells may be configured to be arranged around cylindrical sections of four battery cells of the plurality of battery cells.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 7:
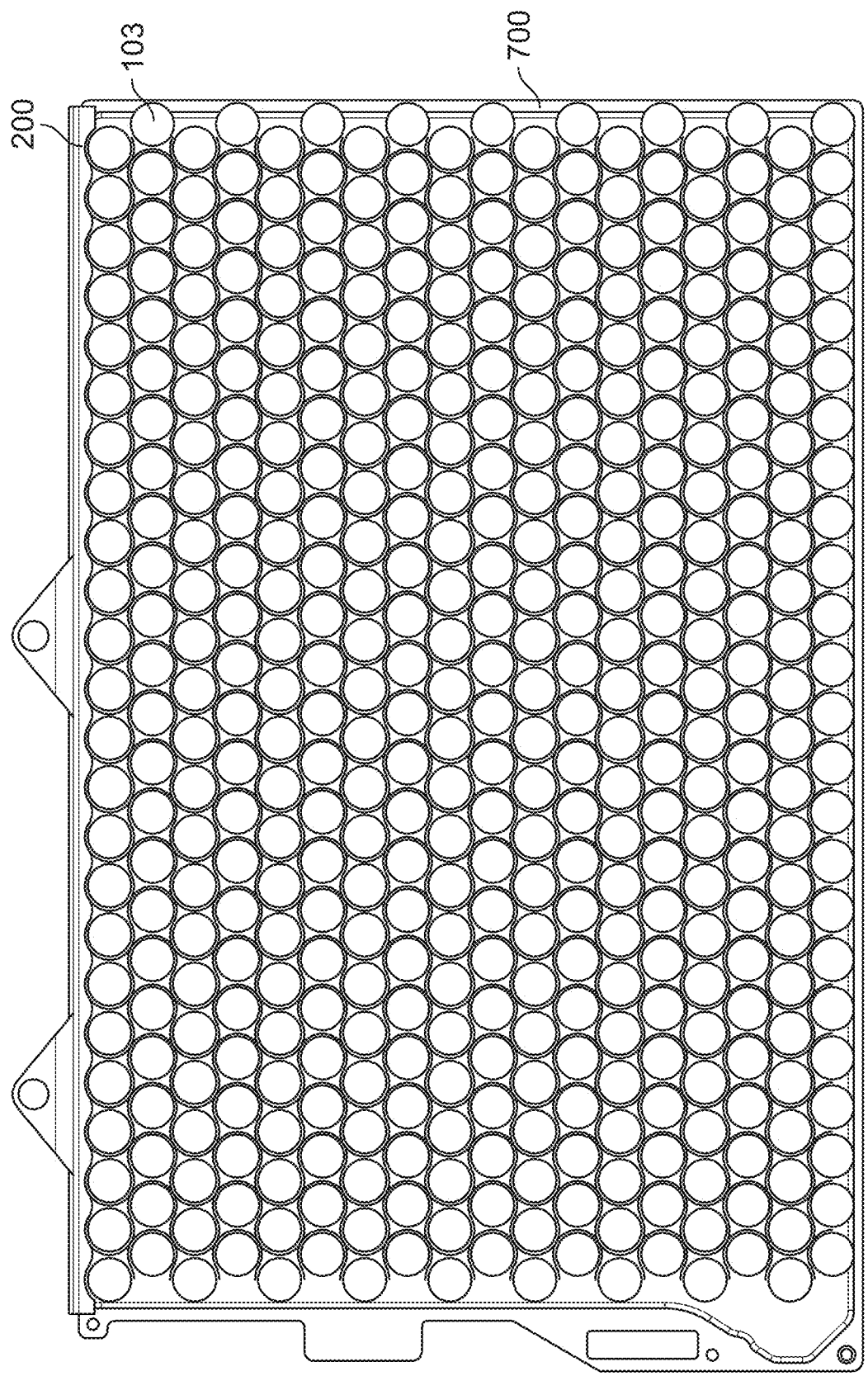
FIG. 7 shows a top view of the barrier structure of FIG. 2 after the barrier structure has been inserted between the plurality of battery cells of the battery module assembly of FIG. 1, in accordance with some embodiments of the present disclosure.
Figure 8:
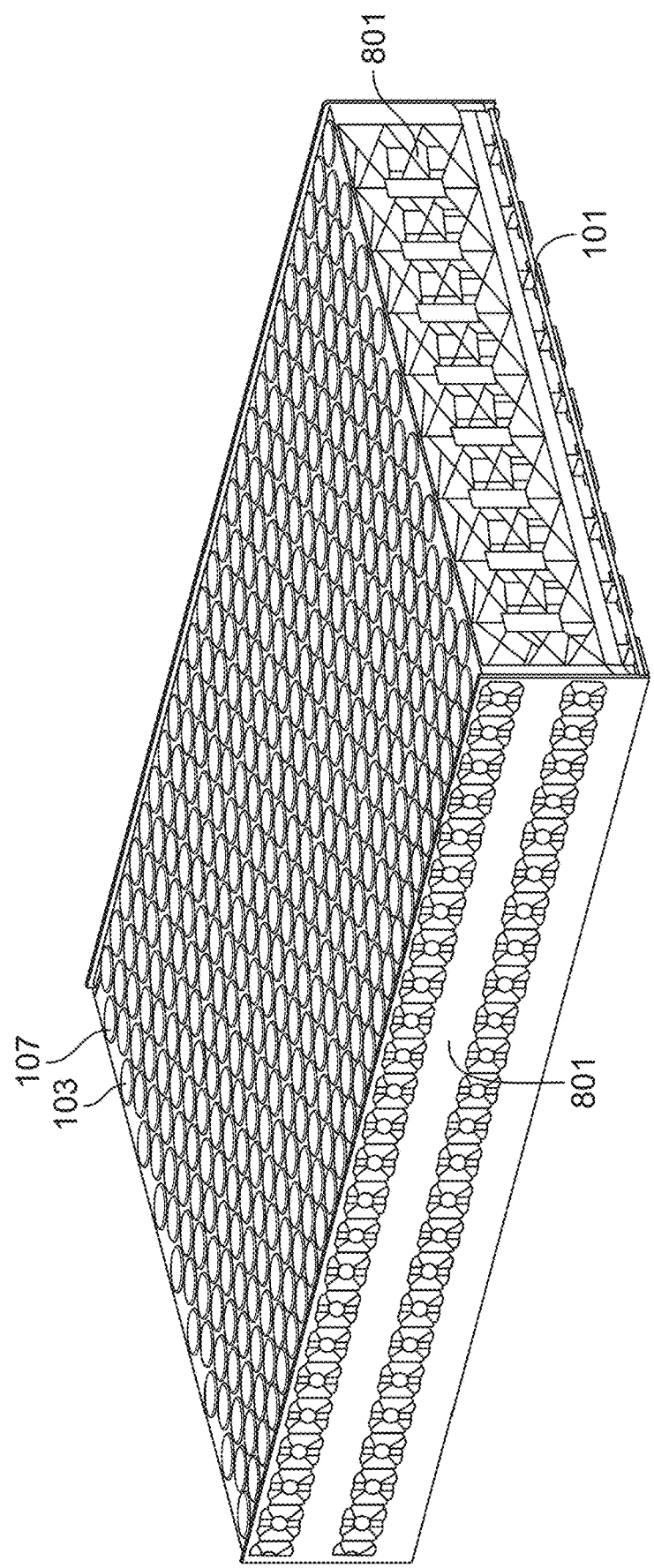
FIG. 8 shows the battery module assembly of FIG. 7 following the addition of module sidewalls, in accordance with some embodiments of the present disclosure.
Figure 9:
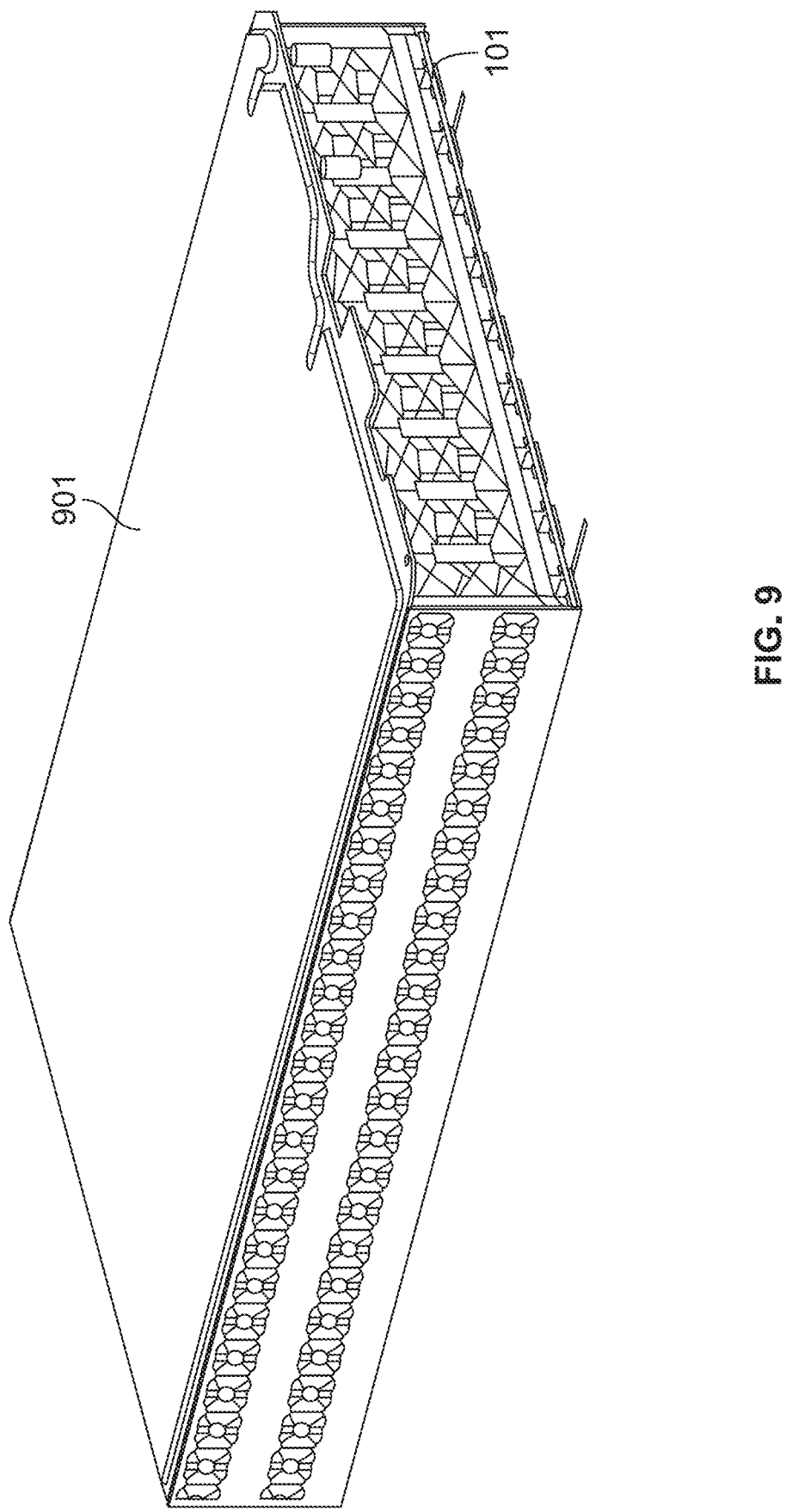
FIG. 9 shows the battery module assembly of FIG. 8 following the installation of a cooling plate, in accordance with some embodiments of the present disclosure.

FIGS. 1-9 show a barrier structure and components of a battery module, such as the battery module of FIG. 9, in accordance with some embodiments of the present disclosure.

Figure 1:
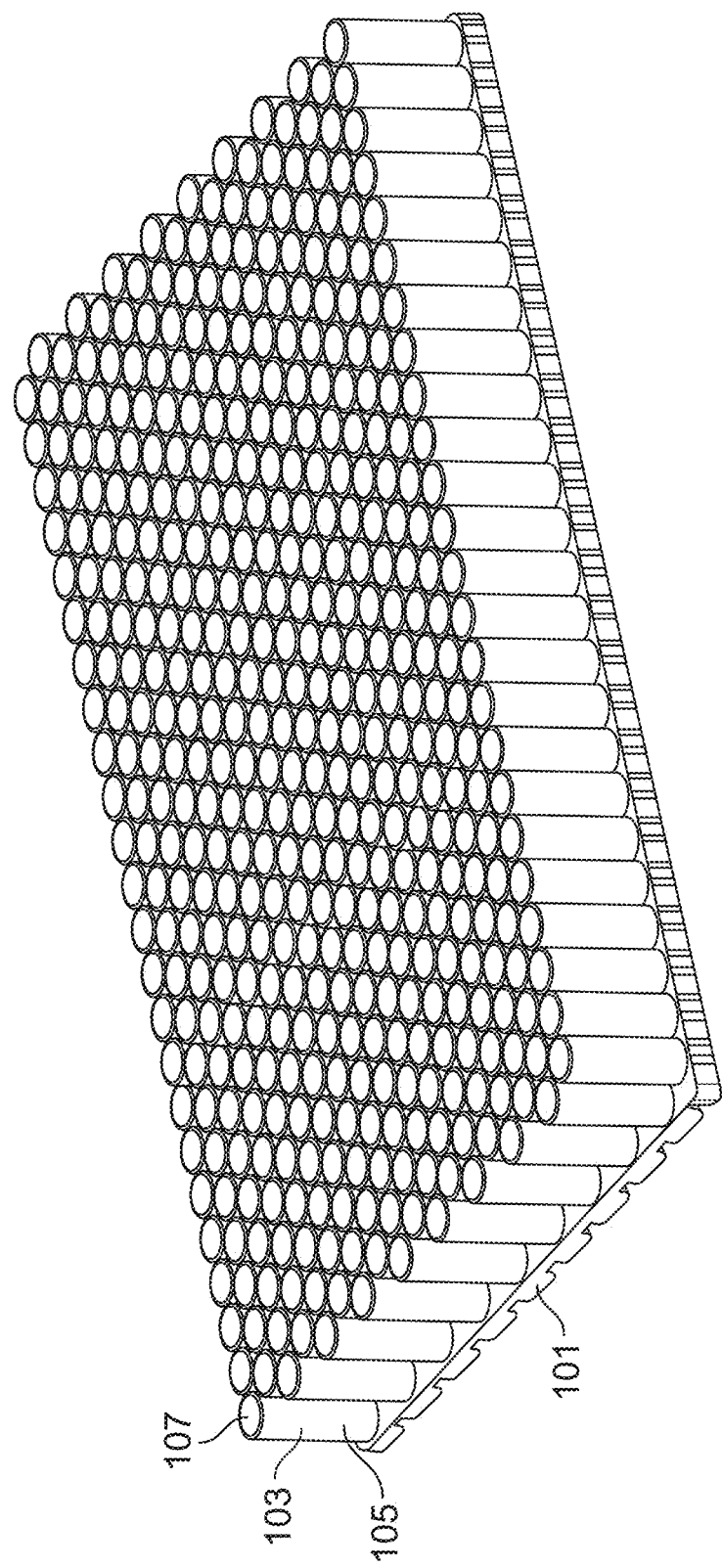
FIG. 1 shows a plurality of battery cells and a carrier layer of a battery module assembly, in accordance with some embodiments of the present disclosure.

FIG. 1 shows a plurality of battery cells 103 and a carrier layer 101 of a battery module assembly, in accordance with some embodiments of the present disclosure. As shown, each of the plurality of battery cells 103 is cylindrical and has a first end 105 and a second end 107. It should be noted that the battery cells 103 with the first end 105 and the second end 107 are provided for purposes of examples and illustration, and other cells with different geometric shapes are also possible. In some embodiments of the present disclosure, the first end 105 may include a first electric terminal (e.g., a center button terminal). In some embodiments of the present disclosure, each of the plurality of battery cells 103 may have an exposed region of electrically active casing or a conductive jacket that covers at least a portion of the second end 107, at least a portion of the first end 105 and a side of each battery cell 103, forming the second electrical terminal (e.g., a rim terminal). As shown, the first end 105 of each of the plurality of battery cells 103 is inserted into and coupled to a respective recess (e.g., using an adhesive) on a first side of the carrier layer 101. In some embodiments of the present disclosure, a current collector assembly including at least one bus bar may be coupled to a second side of the carrier layer and selectively connected to the plurality of battery cells 103. In some embodiments of the present disclosure, the plurality of battery cells 103 may be arranged in a close hexagonal packing configuration. In some embodiments, the smallest distance between adjacent ones of the plurality of battery cells 103 is less than approximately 1.5 millimeters.

Figure 2:
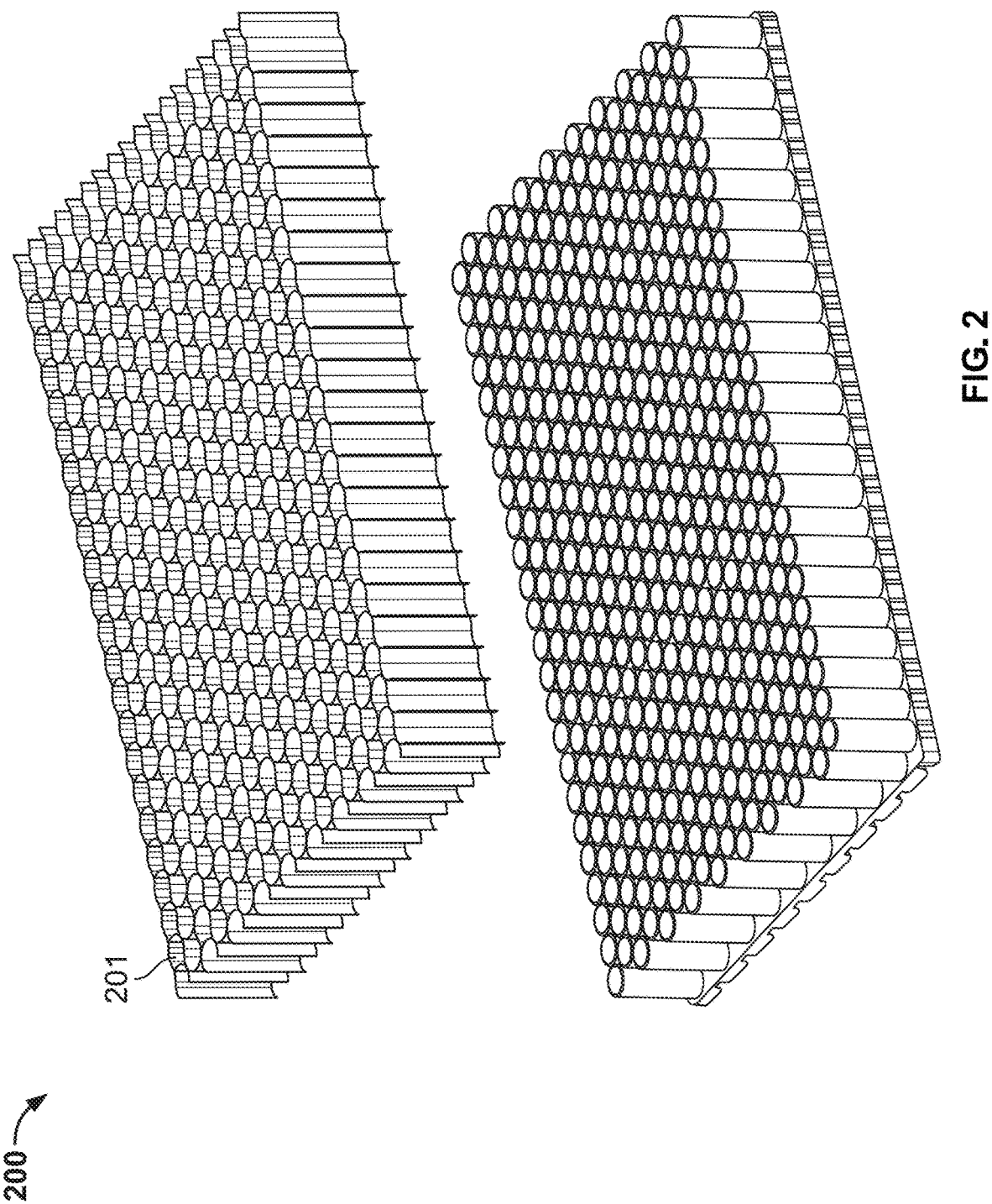
FIG. 2 shows a perspective view of the battery module assembly of FIG. 1, before insertion of a barrier structure, in accordance with some embodiments of the present disclosure.

FIG. 2 shows a perspective view of the battery module assembly of FIG. 1, before insertion of a barrier structure 200, in accordance with some embodiments of the present disclosure. As shown, the barrier structure 200 includes a plurality of sidewalls interlocked to form a grid structure including a plurality of cells 201, as explained in greater detail below with reference to FIGS. 3A-7. As shown, the arrangement of the plurality of cells 201 corresponds to the arrangement of the plurality of battery cells 103, and the thickness of the sidewalls of the barrier structure 200 corresponds to or is less than the distance (e.g., the smallest distance) between adjacent ones of the plurality of battery cells 103 (e.g., so that the barrier structure 200 may be inserted between battery cells of the plurality of battery cells 103). Each of the plurality of cells 201 may be configured to be arranged around a cylindrical middle section of one of the plurality of battery cells 103 and may have an open-ended top and an open-ended bottom so that the barrier structure 200 may be inserted between the plurality of battery cells 103. As shown, each of the internal battery cells 103 will be surrounded by a full cell 201. In some embodiments, battery cells 103 at the edges of the battery module may not be fully surrounded by the cells 201. In some embodiments, the height of the sidewalls of the barrier structure 200 may be less than or equal to the height of each of the plurality of battery cells 103 so that each of the plurality of cells 201 covers only the cylindrical section (e.g., a cylindrical middle section) of each of the plurality of battery cells 103 without clashing with the first side of the carrier 101.

In some embodiments, the barrier structure 200 may comprise a fire-resistant material to prevent a fire from spreading between adjacent battery cells (e.g., when one of the battery cells is undergoing a thermal event). In some embodiments, the barrier structure 200 may also comprise a dielectric material to provide electrical insulation between battery cells 103 operating at different voltages (e.g., between parallel groups of battery cells 103 operating at different voltages). Additionally, depending on the specific requirements of a particular battery module, the barrier structure 200 may be a flexible material (e.g., to allow lower tolerance requirements for the battery modules) or stiff material (e.g., to provide additional structural support to individual battery cells). For example, the barrier structure 200 may be a plastic material, a meta-aramid fiber material (e.g., NOMEX®), a ceramic fiber paper material, a rubber material, a silicone material, a metal material, etc. Depending on the specific requirements of a particular battery module, the required tolerances of the particular battery module, and/or the material of the barrier structure 200, the sidewalls forming the barrier structure 200 may be manufactured using a variety of techniques such as die cutting and forming, extrusion or injection molding.

Figure 3A:
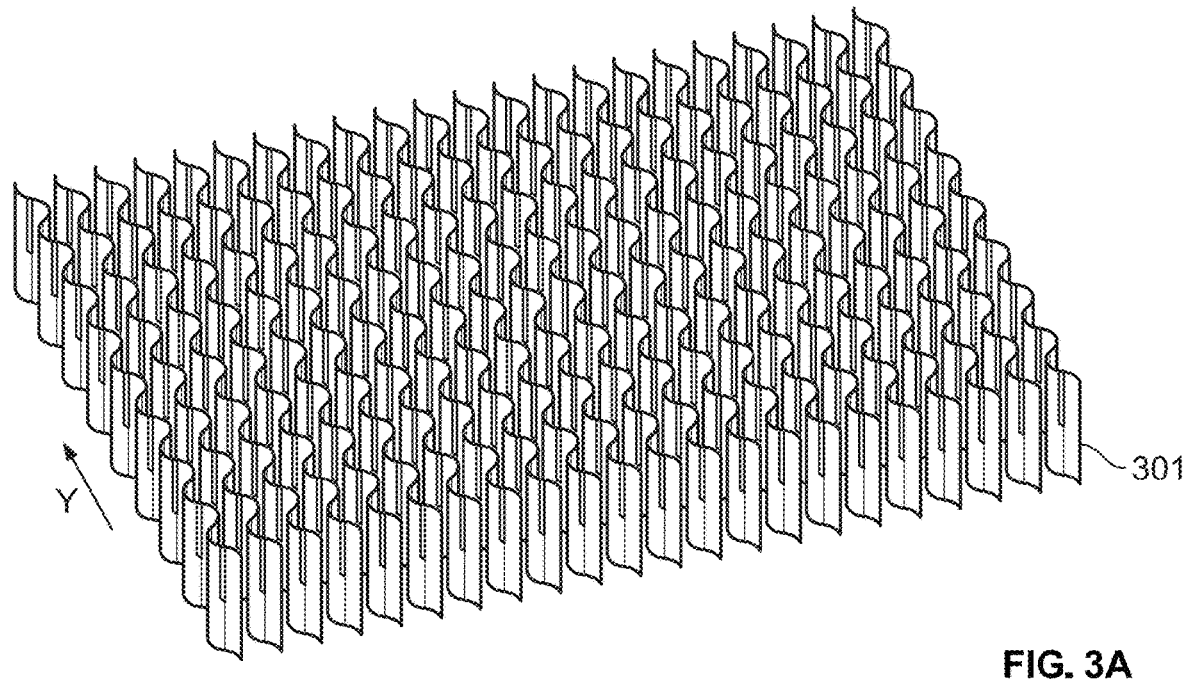
FIGS. 3A and 3B show perspective views of the individual sidewalls forming the barrier structure, in accordance with some embodiments of the present disclosure.
Figure 3B:
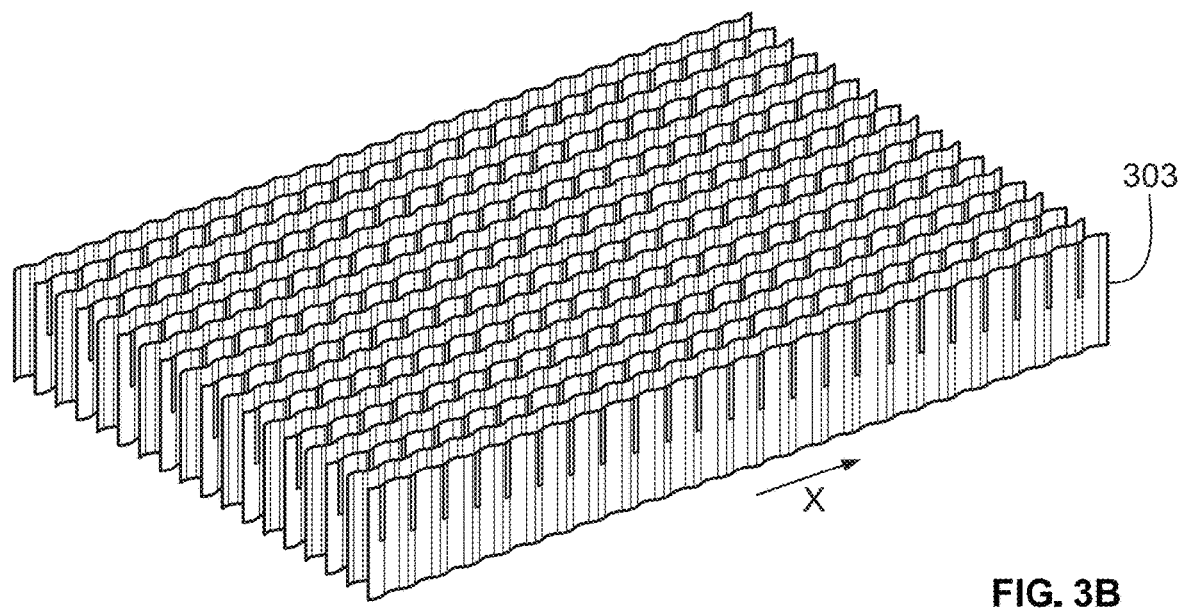

FIGS. 3A and 3B show perspective views of the individual sidewalls forming the barrier structure 200, in accordance with some embodiments of the present disclosure. For example, as shown, the barrier structure 200 is formed of a plurality of first sidewalls 301 oriented in a first direction (e.g., the y-direction) interlocked with a plurality of second sidewalls 303 oriented in a second direction (e.g., the x-direction). Although the first direction is shown as being substantially perpendicular to the second direction, this is only one example, and the first and second direction may intersect at any angle, provided that the plurality of first sidewalls 301 and the plurality of second sidewalls 303 may be inserted between the plurality of battery cells 103. As described in greater detail below with respect to FIGS. 4A and 4B, each of the plurality of first sidewalls 301 and the plurality of second sidewalls 303 may have a serpentine shape along a longitudinal direction of each sidewall.

Figure 4A:
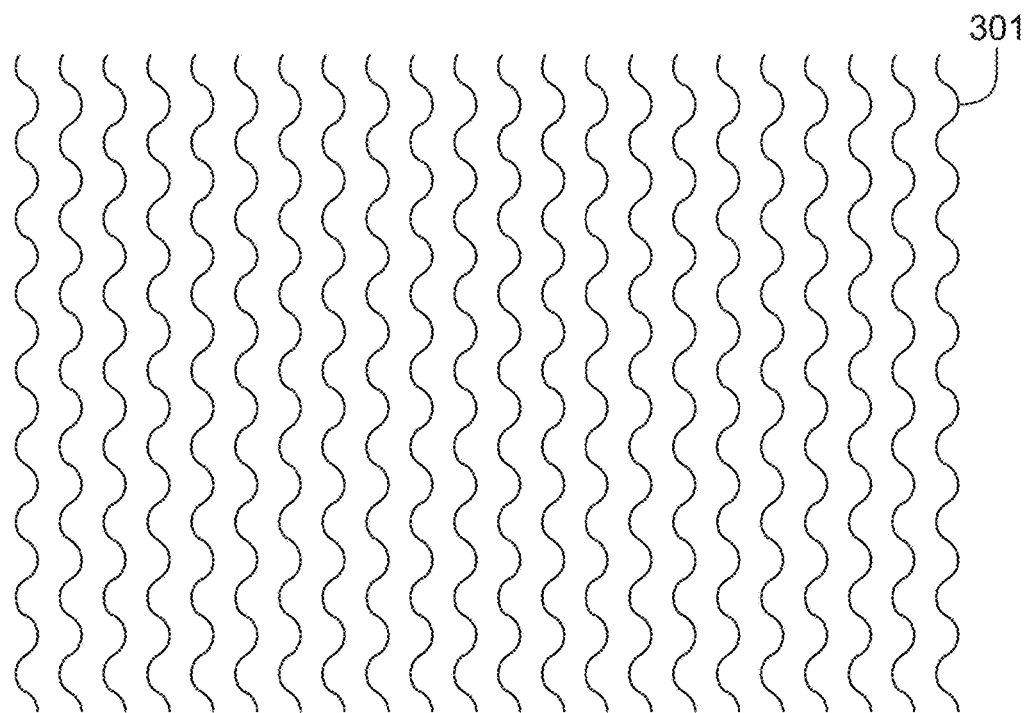
FIGS. 4A and 4B show top views of the plurality of first sidewalls and the plurality of second sidewalls of FIGS. 3A and 3B, respectively, in accordance with some embodiments of the present disclosure.
Figure 4B:
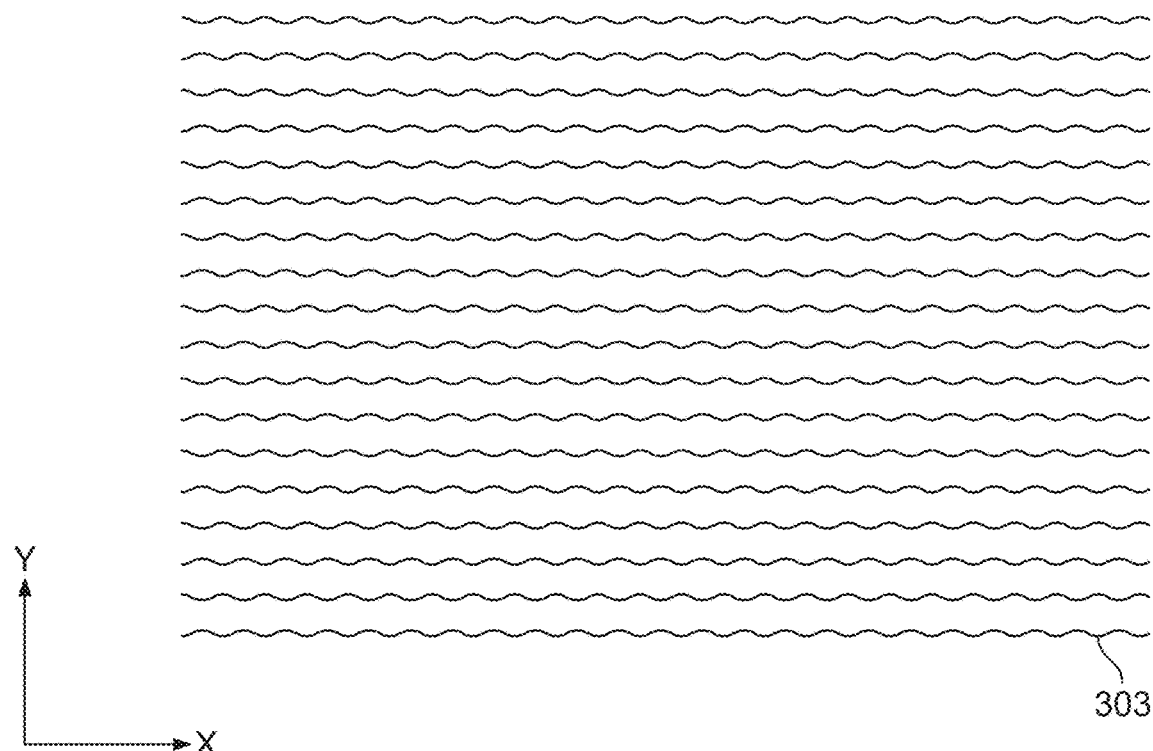

FIGS. 4A and 4B show top views of the plurality of first sidewalls 301 and the plurality of second sidewalls 303 of FIGS. 3A and 3B, respectively, in accordance with some embodiments of the present disclosure. For example, as shown in FIG. 4A, each of the plurality of first sidewalls 301 may be oriented in a first direction (e.g., the y-direction). As shown, the plurality of first sidewalls 301 are arranged such that the serpentine shapes of the plurality of first sidewalls 301 are in phase with each other. As shown in FIG. 4B, each of the plurality of second sidewalls 303 may be arranged in a second direction (e.g., the x-direction). As shown, the plurality of second sidewalls 303 are arranged such that the serpentine shape of adjacent ones of the plurality of second sidewalls 303 have opposite phases (e.g., 180 degrees out of phase). As shown, the serpentine shape of each of the first sidewalls 301 (e.g., a first wave pattern) may differ from the serpentine shape of each of the second sidewalls 303 (e.g., a second wave pattern). For example, the arcs of the serpentine shape of each of the first sidewalls 301 may have a greater distance from the crest to the trough than the arcs of the serpentine shape of each of the first sidewalls 303. In one example, the length of each arc of the serpentine shape of each of the first sidewalls 301 may be 110 to 130 degrees of a circle, while the length of each arc of the serpentine shape of each of the second sidewalls 303 may be 50 to 70 degrees of a circle. When the plurality of first sidewalls 301 and the plurality of second sidewalls 303 are interlocked to form the barrier structure 200, the plurality of cells 201 may correspond to the arrangement of the plurality of battery cells 103.

Figure 5A:
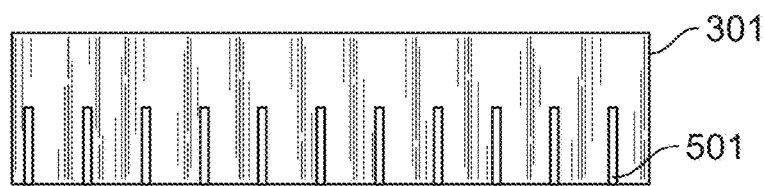
FIGS. 5A and 5B show side views of the plurality of first sidewalls and the plurality of second sidewalls of FIGS. 3A and 3B, respectively, in accordance with some embodiments of the present disclosure.
Figure 5B:
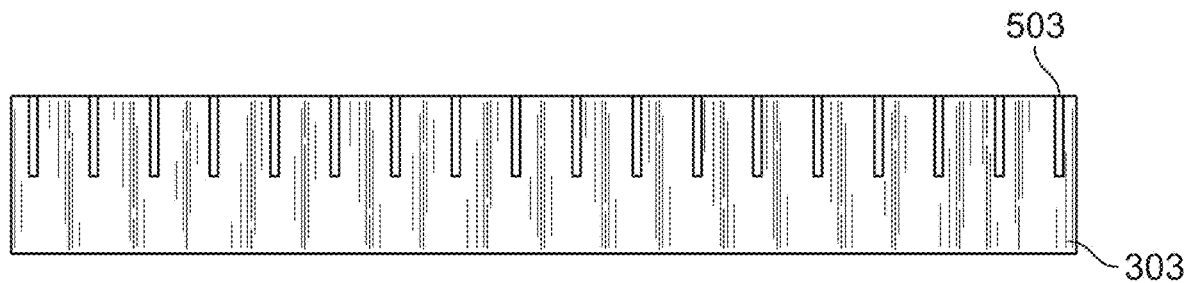

FIGS. 5A and 5B show side views of the plurality of first sidewalls 301 and the plurality of second sidewalls 303 of FIGS. 3A and 3B, respectively, in accordance with some embodiments of the present disclosure. For example, as shown in FIG. 5A, each of the plurality of first sidewalls 301 includes a plurality of first slits 501 (e.g., grooves) spaced apart along a longitudinal direction of each sidewall. Each of the plurality of first slits 501 extends from the bottom to the midpoint of each of the plurality of first sidewalls 301. As shown in FIG. 5B, each of the plurality of second sidewalls 303 includes a plurality of second slits 503 (e.g., grooves) spaced apart along a longitudinal direction of each sidewall. Each of the plurality of second slits 503 extends from the top to the midpoint of each of the plurality of second sidewalls 303. In some embodiments, the length of the plurality of first slits 501 may be different from the length of the plurality of second slits 503, provided that the sum of lengths of interlocking slits is at least greater than or equal to a height of the associated sidewalls 301, 303 (e.g., to allow the sidewalls 301, 303 to fully interlock). Each of the plurality of first slits 501 is configured to interlock with a corresponding one of the plurality of second slits 503 to form the barrier structure 200, as shown in greater detail in FIG. 5C. In some embodiments, the size of each of the plurality of cells 201 may be determined by the spacing of the plurality of first and second slits 501, 503. For example, in one embodiment, the plurality of first and second slits 501, 503 may be spaced apart from each other such that when the plurality of first and second sidewalls 301, 303 are interlocked using every one of the plurality of first and second slits 501, 503, each of the cells 201 of the barrier structure 200 corresponds to a single one of the plurality of battery cells 103. In some embodiments, it may be desirable to include more than one battery cell 103 in each of the cells 201 of the barrier structure 200. To do this, the spacing between adjacent slits among the plurality of first and second slits 501, 503 may be modified or certain ones of the slits among the plurality of first and second slits 501, 503 may be skipped (e.g., by interlocking the first and second sidewalls 301, 303 with every other slit among the plurality of first and second slits 501, 503). For example, the barrier structure 200 may be configured so that each of the plurality of cells 201 may accommodate four battery cells 103. However, this is only an example, and each of the plurality of cells 201 may accommodate any number of battery cells 103.

Figure 5C:
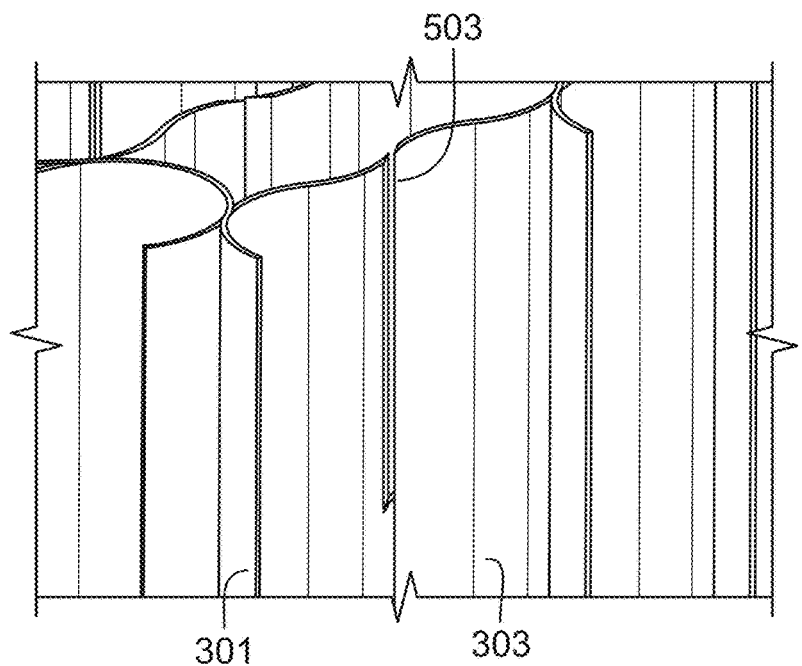
FIG. 5C shows a partial perspective view of a plurality of first sidewalls interlocked with a plurality of second sidewalls, in accordance with some embodiments of the present disclosure.

FIG. 5C shows a partial perspective view of the plurality of first sidewalls 301 interlocked with the plurality of second sidewalls 303, in accordance with some embodiments of the present disclosure. For example, when each of the plurality of first slits 501 is aligned with a corresponding one of the plurality of second slits 503, the plurality of first sidewalls 301 may be interlocked with the plurality of second sidewalls 303 to form the barrier structure 200. As shown, the size of each of the plurality of cells 201 may be adjusted by skipping slits (e.g., a first sidewall 301 may be interlocked with only every other slit among the plurality of second slits 503 of the second sidewall 303). In some embodiments, because the barrier structure 200 is inserted between the plurality of battery cells 103, no additional attachment means (e.g., adhesive, laser welding, etc.) for attaching the interlocked sidewalls may be required. In some embodiments, the interlocked sidewalls may be additionally secured by an additional attachment means. In some embodiments, the plurality of first and second sidewalls 301, 303 may be interlocked before being inserted between the plurality of battery cells 103 (e.g., as shown in FIG. 2). However, this is only an example, and in some embodiments, one of the plurality of first and second sidewalls 301, 303 may be inserted between the plurality of battery cells 103 before the plurality of first and second sidewalls 301, 303 are interlocked within a battery module.

Figure 6:
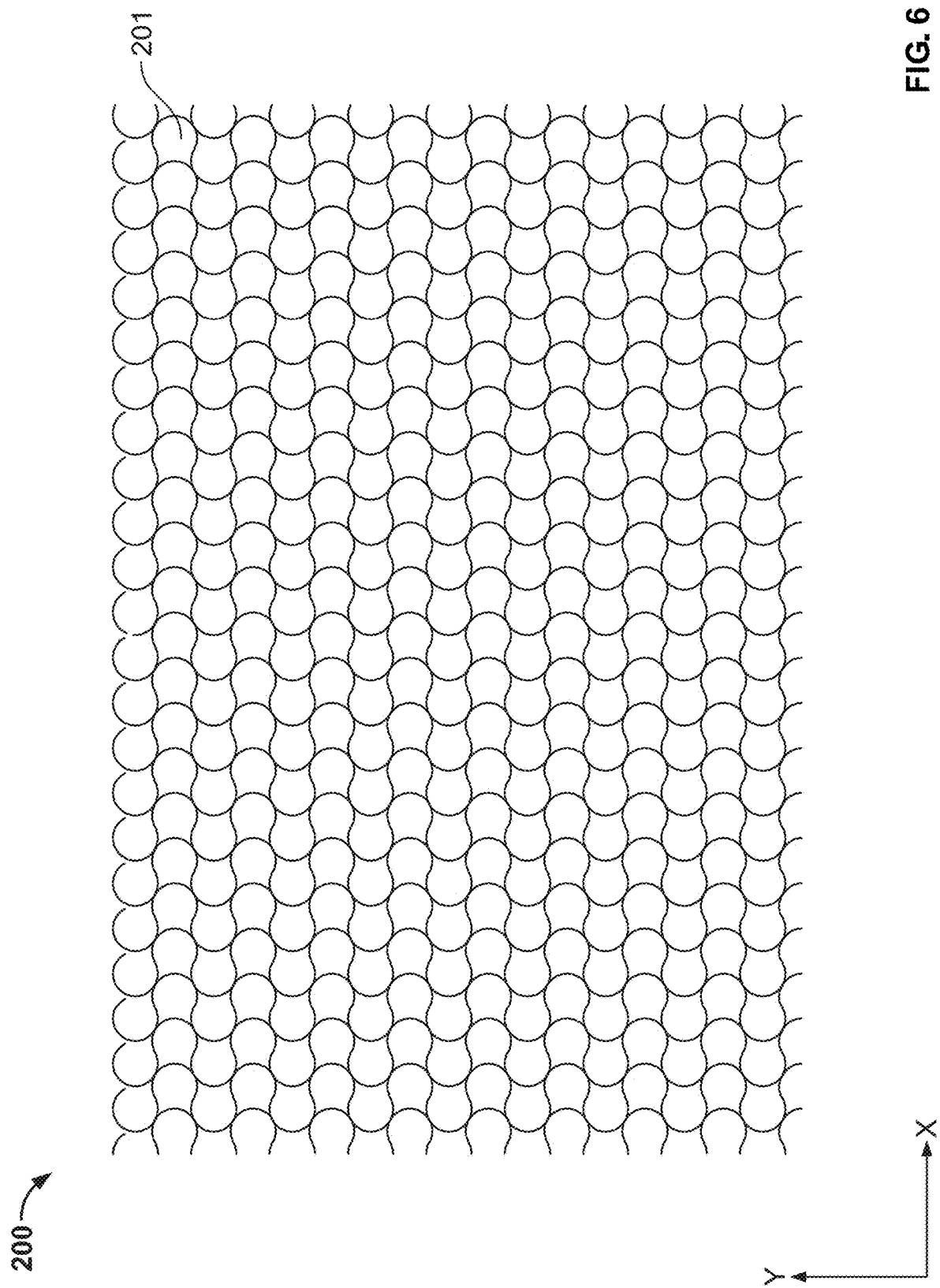
FIG. 6 shows a top view of the barrier structure of FIG. 2, after the plurality of first and second sidewalls have been interlocked, in accordance with some embodiments of the present disclosure.

FIG. 6 shows a top view of the barrier structure 200 of FIG. 2, after the plurality of first and second sidewalls 301, 303 have been interlocked, in accordance with some embodiments of the present disclosure. As shown, the arrangement of the plurality of cells 201 of the barrier structure 200 corresponds to the arrangement of the plurality of battery cells 103 of the battery module assembly of FIG. 1.

FIG. 7 shows a top view of the barrier structure 200 of FIG. 2 after the barrier structure 200 has been inserted between the plurality of battery cells 103 of the battery module assembly of FIG. 1, in accordance with some embodiments of the present disclosure. As shown, each of the internal battery cells 103 is surrounded by a full cell 201, while the battery cells 103 at the edges of the battery module are not fully surrounded by the cells 201. As shown, the battery cells 103 may be installed within a battery module assembly 700.

FIG. 8 shows the battery module assembly of FIG. 7 following the addition of module sidewalls 801, in accordance with some embodiments of the present disclosure. As shown, the addition of module sidewalls 801 results in the plurality of battery cells being encased on at least five sides (i.e., by the carrier layer 101 on one side, by the module sidewalls 801 on four sides. As shown, the second ends 107 of the plurality of battery cells 103 may remain exposed. In some embodiments of the present disclosure, the module sidewalls 801 are attached to the battery module assembly by an adhesive.

FIG. 9 shows the battery module assembly of FIG. 8 following the installation of a cooling plate 901, in accordance with some embodiments of the present disclosure. In some embodiments of the present disclosure, the cooling plate 901 may be coupled to the exposed ends 107 of the plurality of battery cells 103 by an adhesive (e.g., an adhesive with dielectric, thermal filler such as alumina or boron nitride).

In some embodiments of the present disclosure, the thermal transfer plate may be used to selectively heat or cool the battery module assembly. In some embodiments of the present disclosure, the components described may form a first battery submodule that may be combined with a second battery submodule similar to the first battery submodule. For example, the first and second battery submodules may be formed on opposite sides of the cooling plate 901.

In some embodiments of the present disclosure, a method for assembling the battery module described with reference to FIGS. 1-9 is provided. For example, in some embodiments, the plurality of battery cells 103 may be arranged in the carrier layer 101 (e.g., as shown in FIG. 1) before the barrier structure 200 is arranged in the battery module by inserting the plurality of first and second sidewalls 301, 303 between the plurality of battery cells 103 (e.g., arranging each of the plurality of cells 201 around a cylindrical section of at least one of the plurality of battery cells 103). In some embodiments, the plurality of first and second sidewalls 301, 303 may be oriented in the first and second directions (e.g., as shown in FIGS. 4A and 4B, interlocked to form barrier structure 200, and a cylindrical section of the plurality of battery cells 103 arranged into respective ones of the plurality of cells 201 before being arranged in the carrier layer 101. However, it should be understood that the steps of assembling the battery module may be performed in any order to assemble the battery module described with reference to FIGS. 1-9.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A barrier structure comprising:
a plurality of first sidewalls oriented in a first direction to interlock with a plurality of second sidewalls oriented in a second direction substantially perpendicular to the first direction to form a grid structure comprising a plurality of cells,
wherein:
one or more of the plurality of cells has an open-ended top and an open-ended bottom;
one or more of the plurality of cells is configured to be arranged around at least one of a plurality of batteries;
each of the plurality of first sidewalls and the plurality of second sidewalls comprises a serpentine shape having alternating arcs along a longitudinal direction of each sidewall; and
the plurality of second sidewalls are arranged such that the serpentine shapes of adjacent ones of the plurality of second sidewalls are out of phase with each other.

2. The barrier structure of claim 1, wherein each one of a subset of the plurality of cells is formed by:
a first pair of sidewalls, of the plurality of first sidewalls, arranged next to each other in the barrier structure; and
a second pair of sidewalls, of the plurality of second sidewalls, arranged next to each other in the barrier structure.

3. The barrier structure of claim 1, wherein:
each of the plurality of first sidewalls comprises a plurality of first slits spaced apart in the first direction, each of the plurality of first slits extending from the open-ended bottom toward the open-ended top;
each of the plurality of second sidewalls comprises a plurality of second slits spaced apart in the second direction, each of the plurality of second slits extending from the open-ended top toward the open-ended bottom; and
each of the plurality of first slits is configured to interlock with a corresponding one of the plurality of second slits to form the grid structure.

4. The barrier structure of claim 1, wherein the plurality of cells of the grid structure are shaped to accommodate the plurality of batteries arranged in a close-hex-pack configuration.

5. The barrier structure of claim 1, wherein the plurality of first sidewalls are arranged such that the serpentine shapes of the plurality of first sidewalls are in phase with each other with respect to the first direction.

6. The barrier structure of claim 5, wherein the serpentine shapes of the adjacent ones of the plurality of second sidewalls are 180 degrees out of phase with each other with respect to a second direction.

7. The barrier structure of claim 6, wherein:
the serpentine shape of each of the plurality of first sidewalls comprises a plurality of adjacent first arcs, and
a length of each of the first arcs is 110 to 130 degrees of a circle.

8. The barrier structure of claim 7, wherein:
the serpentine shape of each of the plurality of second sidewalls comprises a plurality of adjacent second arcs, and
a length of each of the second arcs is 50 to 70 degrees of a circle.

9. The barrier structure of claim 1, wherein the plurality of first sidewalls and the plurality of second sidewalls comprise a plastic material, a meta-aramid fiber material, a ceramic fiber paper material, a rubber material, or a silicone material.

10. The barrier structure of claim 1, wherein each of the plurality of cells is configured to be arranged around cylindrical sections of four batteries of the plurality of batteries.

11. An apparatus comprising:
a barrier structure comprising:
a plurality of first sidewalls oriented in a first direction; and
a plurality of second sidewalls oriented in a second direction substantially perpendicular to the first direction,
wherein:
the plurality of first sidewalls interlock with the plurality of second sidewalls to form a grid structure comprising a plurality of cells;

each of the plurality of cells has an open-ended top and an open-ended bottom;

each of the plurality of cells is configured to be arranged around a cylindrical section of at least one of a plurality of batteries;

each of the plurality of first sidewalls and the plurality of second sidewalls comprises a serpentine shape having alternating arcs along a longitudinal direction of each sidewall; and the plurality of second sidewalls are arranged such that the serpentine shapes of adjacent ones of the plurality of second sidewalls are out of phase with each other.

12. The apparatus of claim 11, wherein each one of a subset of the plurality of cells is formed by:

a first pair of sidewalls, of the plurality of first sidewalls, arranged next to each other in a battery; and a second pair of sidewalls, of the plurality of second sidewalls, arranged next to each other in the battery.

13. The apparatus of claim 11, wherein:

each of the plurality of first sidewalls comprises a plurality of first slits spaced apart in the first direction, each of the plurality of first slits extending from the open-ended bottom toward the open-ended top;

each of the plurality of second sidewalls comprises a plurality of second slits spaced apart in the second direction, each of the plurality of second slits extending from the open-ended top toward the open-ended bottom;

each of the plurality of first slits is configured to interlock with a corresponding one of the plurality of second slits to form the grid structure; and the first direction is substantially perpendicular to the second direction.

14. The apparatus of claim 11, further comprising the plurality of batteries, wherein:

the plurality of batteries are arranged in a close-hex-pack configuration; and the plurality of cells of the grid structure are shaped to accommodate the plurality of batteries arranged in the close-hex-pack configuration.

15. The apparatus of claim 11, wherein:

the plurality of first sidewalls are arranged such that the serpentine shapes of the plurality of first sidewalls are in phase with each other with respect to the first direction; and the serpentine shapes of the adjacent ones of the plurality of second sidewalls are 180 degrees out of phase with each other with respect to the second direction.

16. The apparatus of claim 11, wherein the plurality of first sidewalls and the plurality of second sidewalls comprise a plastic material, a meta-aramid fiber material, a ceramic fiber paper material, a rubber material, or a silicone material.

17. A method of assembling a barrier structure, the method comprising:

providing a plurality of batteries, a plurality of first sidewalls, and a plurality of second sidewalls;

arranging the plurality of batteries in a predetermined pattern;

orienting the plurality of first sidewalls in a first direction and the plurality of second sidewalls in a second direction substantially perpendicular to the first direction;

interlocking the plurality of first sidewalls with the plurality of second sidewalls to form a grid structure comprising a plurality of cells, wherein one or more of the plurality of cells has an open-ended top and an open-ended bottom; and arranging each of the plurality of cells around a cylindrical section of at least one of the plurality of batteries, wherein each of the plurality of first sidewalls and the plurality of second sidewalls comprises a serpentine shape having alternating arcs along a longitudinal direction of each sidewall, and wherein the plurality of second sidewalls are arranged such that the serpentine shapes of adjacent ones of the plurality of second sidewalls are out of phase with each other.

\* \* \* \* \*